United States Patent [19]

Nagashima

[11] Patent Number: 4,486,047
[45] Date of Patent: Dec. 4, 1984

[54] SEAT SLIDING DEVICE WITH MOVABLE RAIL RETAINER

[75] Inventor: Hideyuki Nagashima, Yokohama, Japan

[73] Assignee: Nissan Motor Co., Ltd., Yokohama, Japan

[21] Appl. No.: 456,332

[22] Filed: Jan. 6, 1983

[30] Foreign Application Priority Data

Jan. 21, 1982 [JP] Japan .............................. 57-6602[U]

[51] Int. Cl.³ .............................................. B60N 1/08
[52] U.S. Cl. ................................. 296/65 A; 297/216; 248/429
[58] Field of Search ........................ 296/65 A, 65 R; 248/429, 430; 297/216

[56] References Cited

U.S. PATENT DOCUMENTS

| | | | |
|---|---|---|---|
| 3,845,982 | 11/1974 | Pickles | 296/65 R |
| 4,040,591 | 8/1977 | Pickles | 248/429 |
| 4,262,963 | 4/1981 | Bauer et al. | 296/65 R |

FOREIGN PATENT DOCUMENTS 55-30740  7/1980  Japan .

Primary Examiner—Robert R. Song
Attorney, Agent, or Firm—Schwartz, Jeffery, Schwaab, Mack, Blumenthal & Koch

[57] ABSTRACT

In a seat sliding device of a motor vehicle having a stationary rail secured to the vehicle floor with an elongate clearance defined between the stationary rail and the vehicle floor and a movable rail to which a seat is securely mounted, the movable rail being axially slidably engaged with the stationary rail so that movement of the movable rail relative to the stationary rail induces movement of the seat relative to the vehicle floor, there is provided at least one rigid frame member which is secured to the movable rail to move therewith and has an extension which embraces the stationary rail by having at least a portion thereof passed through the elongate clearance.

7 Claims, 5 Drawing Figures

SEAT SLIDING DEVICE WITH MOVABLE RAIL RETAINER

BACKGROUND OF THE INVENTION

The present invention relates to a seat sliding device of a motor vehicle, and more particularly to a device of a type wherein a retainer means is provided for preventing disengagement of a movable rail from a stationary rail even upon a vehicle collision.

SUMMARY OF THE INVENTION

According to the present invention, there is provided an improved seat sliding device of a motor vehicle, which has a movable rail retaining means by which a movable rail is prevented from disengaging from a stationary rail even in a vehicle collision.

The seat sliding device of the present invention comprises a stationary rail secured to the floor of the vehicle in a manner to form an elongate clearance between the major portion of the stationary rail and the vehicle floor, a movable rail to which a seat is securely mounted, the movable rail being axially slidably engaged with the stationary rail so that movement of the movable rail relative to the stationary rail induces movement of the seat relative to the vehicle floor, at least one rigid frame member having an extension which embraces the stationary rail by having at least a portion thereof passed through the elongate clearance, and connecting means connecting securely the rigid frame member to the movable rail so that the rigid frame member is movable with the movable rail keeping the stationary rail embracement thereof.

BRIEF DESCRIPTION OF THE DRAWINGS

Other objects and advantages of the present invention will become clear from the following description when taken in conjunction with the accompanying drawings, in which.

DETAILED DESCRIPTION OF THE INVENTION

Figure 1:
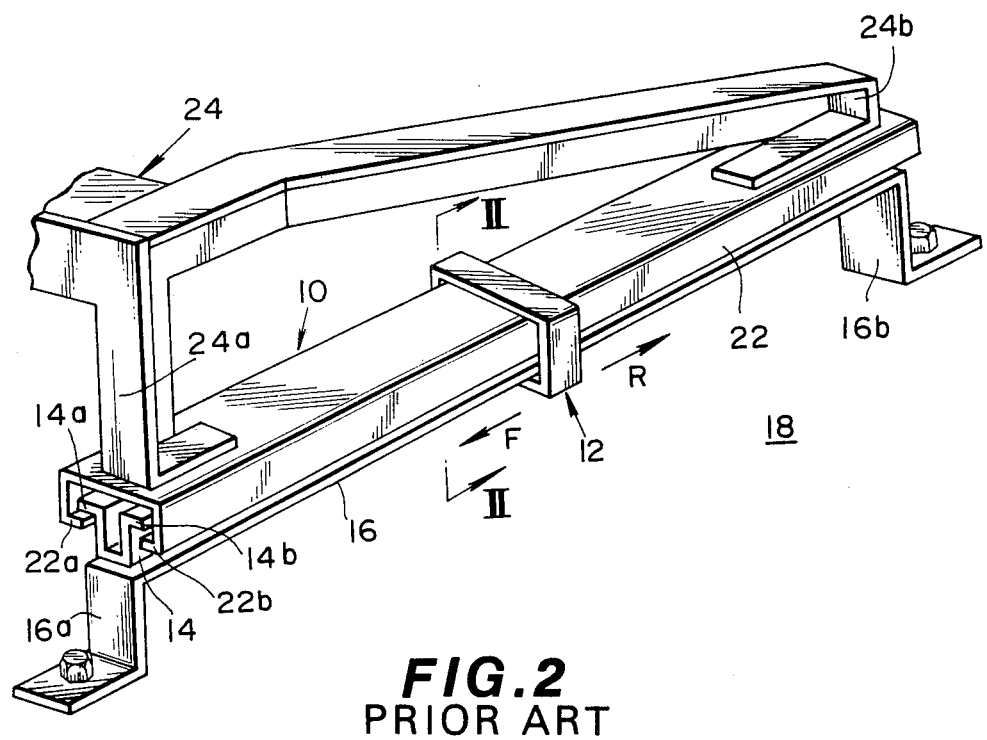
FIG. 1 is a perspective view of a conventional seat sliding device equipped with a retainer means for preventing disengagement of the upper or movable rail from the lower or stationary rail.
Figure 2:
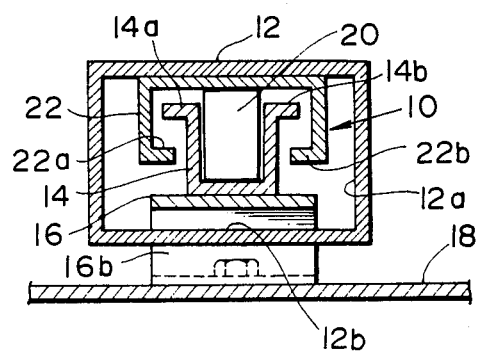
FIG. 2 is a sectional view taken along the line II—II of FIG. 1.

Prior to describing the present invention, in order to clarify the constructional operation of the invention, a conventional seat sliding devices equipped with a retainer means will be outlined with reference to FIGS. 1 and 2.

Referring to FIGS. 1 and 2, especially FIG. 1, there is shown a conventional seat sliding device 10 equipped with a retainer means 12, which device is disclosed in Japanese Utility Model Application Second Publication No. 55-30740. The seat sliding device 10 comprises a lower rail 14 securedly fixed to a raised flat portion of a rigid supporter 16 which is bolted at both its ends 16a and 16b to the vehicle floor 18. The lower rail 14 is constructed to have an angularly •-shaped cross section. A plurality of rollers, of which one roller 20 is shown in FIG. 2, are disposed in the groove section of the lower rail 14. Rollers 20 are free to roll along the groove. An upper (or movable) rail 22 having an angularly C-shaped cross section rides on the rollers 20 and has inwardly bent flange sections 22a and 22b enclosing the outwardly bent flange sections 14a and 14b of the lower rail 14. As is seen from FIG. 2, in order to prevent the upper rail 22 from disengaging from the lower rail 14 during sliding of the rail 22, the distance between the inner ends of the inwardly directed flanges 22a and 22b of the movable rail 22 is made smaller than that between the outer ends of the outwardly directed flanges 14a and 14b. A seat frame 24 on which a seat (not shown) is mounted includes front and rear stand portions 24a and 24b through which it is secured to the upper rail 22. The movement of the seat in the fore-and-aft directions is thus carried out by sliding the upper rail 22 along the lower rail 14 on the rollers 20.

In order to prevent harm to the passengers due to the disengagement of the seat assembly from the vehicle floor 18 upon a vehicle collision or the like, publication No. 55-30740 proposes to employ a movable rail retaining means 12. The means 12 comprises a rigid rectangular frame 12 having an enclosed rectangular opening 12a. As is seen from FIG. 1, the frame 12 is axially slidably disposed about the rectangular unit which comprises the supporter 16, the lower rail 14 and the upper rail 22. Usually, the frame 12 is positioned at the rear stand portion 24b of the seat frame 24. If a vehicle collision causes the upper rail 22 to rise up, the frame 12 lifts together with the upper rail 22 and engages supporter 16 thus preventing the disengagement of the upper rail 22 from the lower rail 14, or at least from the supporter 16.

However, it has been found that the above-described structure does not function satisfactorily in a severe vehicle collision because of the slidable or movable arrangement of the frame 12. In fact, when the vehicle is subjected to such a severe collision, particularly, to a front end collision, the frame 12 moves forwards due to the inertia caused by the collision. Thus, the rear portion of the sliding device 10, to which the greatest force is applied, is no longer protected by the frame 12. Therefore, the rear portion of the upper rail 22 is easily disengaged from the lower rail 14 thereby raising the seat and placing the seat occupant in danger. It has been also found that a undesirable displacement of the retainer frame 12 occurs during seat position adjustment.

Figure 3:
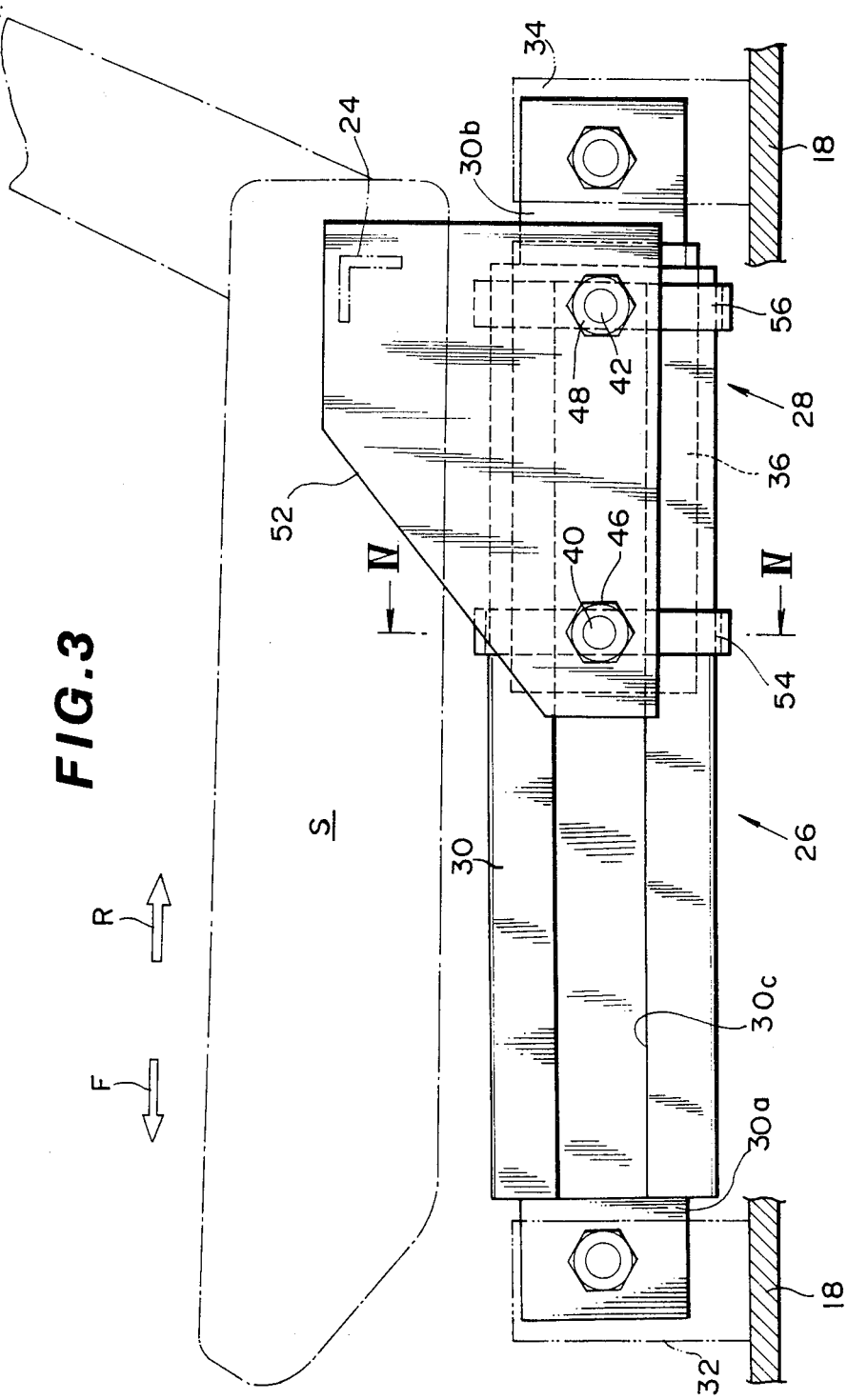
FIG. 3 is a front view of a seat sliding device equipped with a retainer means according to the present invention.
Figure 4:
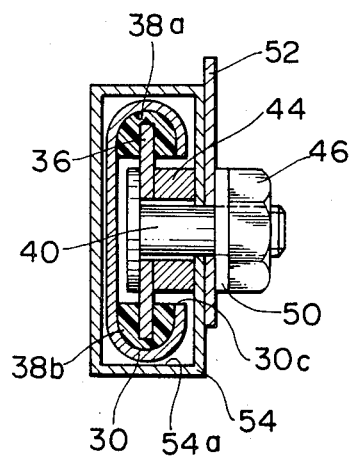
FIG. 4 is a sectional view taken along the line IV—IV of FIG. 3.

Referring to FIGS. 3 and 4, there is shown a seat sliding device 26 equipped with an improved retainer means 28 according to the present invention. The seat sliding device 26 comprises a stationary rail 30 having a generally C-shaped cross section as is seen from FIG. 4. The stationary rail 30 extends in the fore-and-aft direction of the vehicle and is bolted at its longitudinally opposed end portions 30a and 30b to front and rear supporters 32 and 34 which are secured to the vehicle floor 18. As is understood from FIG. 4, the stationary rail 30 is so arranged as to have the elongate opening 30c thereof oriented laterally outwardly with respect to the seat S (see FIG. 3) mounted thereover. A movable rail or plate 36 is axially movably disposed in the stationary rail 30. The movable rail 36 is provided at its upper and lower sides with slide blocks 38a and 38b made of, for example, plastics in order to achieve better sliding movement of the movable rail 36 relative to the stationary rail 30. The movable rail 36 is formed with two openings (no numerals) through which headed bolts 40 and 42 pass and project laterally outwardly therefrom. Spacers 44 are respectively mounted on the bolts 40 and 42. Nuts 46 and 48 and spring washers 50 are engaged with the threaded portions of the bolts 40 and 42 to fasten a bracket 52 to the bolts 40 and 42 and thus to the movable rail 36. For this purpose, the bracket 52 is formed with openings (no numerals) through which the bolts 40 and 42 pass, respectively. As is seen from FIG. 3, the upper portion of the bracket 52 is secured to the seat frame 24 of the seat S. (Although not shown in the drawings, another seat sliding device having an identical construction to the above-mentioned one is arranged beside the mentioned one.) Thus, it will be appreciated that the movement of the seat S in the fore-and-aft direction is carried out by sliding the movable rail 36 along the stationary rail 30.

In accordance with the present invention, the following construction is provided for preventing the disengagement of the seat assembly from the vehicle floor 18 upon a vehicle collision or the like. Two rigid rectangular frames 54 and 56 are employed, each having an enclosed rectangular opening 54a (56a). As is seen from the drawings, each frame 54 or 56 encloses the stationary rail 30 with its outside wall portion tightly sandwiched between the spacer 44 and the bracket 52. For this purpose, the outside wall portion of each frame is formed with an opening through which the corresponding bolt 40 or 42 passes.

Although not shown in the drawings, a known seat locking device is arranged to lock the movable rail 36 relative to the stationary rail 30. Thus, when a change of the position of the seat is intended, the seat locking device is moved to its inoperative position and the seat S is moved forward (in the direction of the arrow F) or rearward (in the direction of the arrow R) to a desired position and then the seat locking device is moved to its operative or locking position. During movement of the seat S, the frames 54 and 56 move together with the movable rail 36 relative to the stationary rail 30, sliding over the stationary rail 30.

When, the vehicle is subjected to a collision, for example, a front end collision, a great force is applied to the seat sliding device 26 in a direction causing the rear portion of movable rail 36 to rise up from the stationary rail 30. However, in the invention, at least the retainer frame 56 is instantly ready to hold the rear portion of the movable rail 36 because of its tight connection with the bolt 42. Thus, the retainer frame 56 can prevent the disengagement of the movable rail 36 from the stationary rail 30, unlike in the case of the afore-mentioned conventional construction. The front retainer frame 54 exhibits its maximum retaining function upon a rear vehicle collision.

Figure 5:
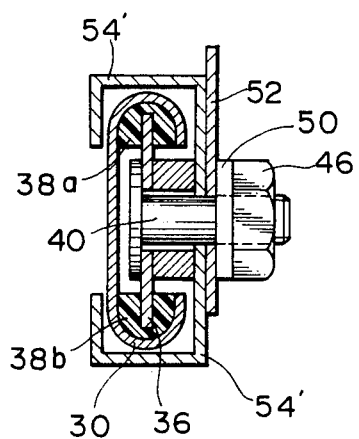
FIG. 5 is a view similar to FIG. 4, but showing a modification of the present invention.

Referring to FIG. 5, there is shown a modification of the present invention. In this modification, a generally C-shaped retainer frame 54' is used as a substitute for the frame 54 or 56 of FIGS. 3 and 4. With this, substantially the same retaining function as that of FIGS. 3 and 4 is expected.

What is claimed is:

1. A seat sliding device of a motor vehicle, comprising:
   a stationary rail secured to the floor of said vehicle in a manner to define an elongate clearance between a major portion of said stationary rail and the floor of said vehicle;
   a movable rail to which a seat is securely mounted, said movable rail being axially slidably engaged with said stationary rail so that movement of said movable rail relative to said stationary rail induces movement of said seat relative to the vehicle floor;
   at least one rigid frame member having an extension which embraces said stationary rail by having at least a portion passed through said elongate clearance; and
   connecting means securely connecting said rigid frame member to said movable rail so that said rigid frame member is movable with said movable rail and is held embracing the stationary rail;
   wherein said connecting means is located at a postion where a rigid bracket secured to a seat frame of the seat is directly connected to said movable rail, said connecting means including a bolt extending from said movable rail, a spacer mounted on said bolt, and a nut engaged with a threaded portion of said bolt, respective portions of said frame and said bracket being tightly disposed between said spacer and said nut.

2. A seat sliding device as claimed in claim 1, in which said rigid frame member is a rectangular member which has a rectangular opening through which the major portion of said stationary rail passes with a clearance therebetween.

3. A seat sliding device as claimed in claim 2, in which said rectangular opening is an enclosed opening.

4. A seat sliding device as claimed in claim 1, in which said connecting means further comprises a spring washer which is disposed between the portion of said bracket and said nut to assure connection of said bracket and said frame member with said movable rail.

5. A seat sliding device as claimed in claim 1, in which said stationary rail has a generally C-shaped cross section and is arranged so as to have the elongate opening thereof oriented laterally outwardly with respect to the seat, and in which said movable rail is axially movably disposed in said stationary rail, said movable rail being provided at its upper and lower sides with slide blocks for achieving better sliding movement of said movable rail relative to said stationary rail.

6. A seat sliding device as claimed in claim 1, in which said rigid frame member is a rectangular member which has a rectangular opening through which said stationary rail passes with a clearance therebetween.

7. A seat sliding device as claimed in claim 6, in which said rectangular opening is an enclosed opening.

* * * * *